(12) United States Patent
Schibsbye

(10) Patent No.: US 9,422,916 B2
(45) Date of Patent: Aug. 23, 2016

(54) METHOD FOR MANUFACTURING A WIND TURBINE ROTOR BLADE

(75) Inventor: Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 658 days.

(21) Appl. No.: 13/267,244

(22) Filed: Oct. 6, 2011

(65) Prior Publication Data

US 2012/0091627 A1 Apr. 19, 2012

(30) Foreign Application Priority Data

Oct. 13, 2010 (EP) .................................... 10187414

(51) Int. Cl.
*B29C 70/44* (2006.01)
*F03D 1/06* (2006.01)
*B29L 31/08* (2006.01)

(52) U.S. Cl.
CPC ............ *F03D 1/0675* (2013.01); *B29C 70/443* (2013.01); *B29C 70/446* (2013.01); *B29L 2031/085* (2013.01); *F05B 2230/00* (2013.01); *Y02E 10/721* (2013.01); *Y02E 10/722* (2013.01); *Y02P 70/523* (2015.11)

(58) Field of Classification Search
CPC ............... B29C 70/443; B29C 70/446; B29L 2031/085; F03D 1/0675; F05B 2230/00; Y02E 10/721; Y02E 10/722
USPC ........................................................ 264/258
See application file for complete search history.

(56) References Cited

U.S. PATENT DOCUMENTS

| | | | |
|---|---|---|---|
| 2,945,262 A | 7/1960 | Petty | |
| 4,808,362 A | 2/1989 | Freeman | |
| 5,213,476 A | 5/1993 | Monroe | |
| 5,939,007 A | 8/1999 | Iszczyszyn et al. | |
| 6,264,877 B1 | 7/2001 | Pallu De La Barriere | |
| 6,540,954 B1 * | 4/2003 | Kramers ................. | B29C 70/34 156/245 |
| 2003/0116262 A1 | 6/2003 | Stiesdal et al. | |
| 2006/0188378 A1 | 8/2006 | Bech et al. | |

FOREIGN PATENT DOCUMENTS

| | | |
|---|---|---|
| CN | 1058168 A | 1/1992 |
| CN | 1283149 A | 2/2001 |
| CN | 101327654 A | 12/2008 |
| EP | 1310351 A1 | 5/2003 |
| EP | 2123431 A1 | 11/2009 |
| JP | 2008531902 A | 8/2008 |
| WO | WO 2009032195 A1 | 3/2009 |
| WO | 2009139619 A1 | 11/2009 |

* cited by examiner

Primary Examiner — Robert J Grun

(57) ABSTRACT

A method for forming a profile for a hollow component is provided. A first composite fiber layer is laid out on a first surface corresponding to a first profile section of the component. A second composite fiber layer is laid out in a second surface corresponding to a second profile section of the component. A collapsed bag is laid out in onto the first composite fiber layer. The bag and the first composite fiber layer are fixed to the first surface. First and second mould elements are coupled such that the first surface and the second surface correspond to the first and second profiles. The bag is inflated such that the first composite fiber layer is pressed to the first surface and the second composite fiber layer is pressed to the second surface so that the first and second layers are coupled to form the profile.

8 Claims, 3 Drawing Sheets

METHOD FOR MANUFACTURING A WIND TURBINE ROTOR BLADE

CROSS REFERENCE TO RELATED APPLICATION

This application claims priority of European Patent Office application No. 10187414.7 EP filed Oct. 13, 2010, which is incorporated by reference herein in its entirety.

FIELD OF INVENTION

The present invention relates to a method for forming a profile for manufacturing a hollow component made of composite fibre, in particular of a hollow blade for a wind turbine. Moreover, the present invention relates to a blade for a wind turbine and to a moulding system.

ART BACKGROUND

Wind turbine blades for wind turbine becoming larger and larger in size. Hence, modern wind turbine blades are mostly made of composite fibre, in particular made of glass fibre. In order to manufacture such large wind turbine blades, several manufacturing methods, such as resin transfer moulding, are applied.

EP 1 310 351 A1 discloses a method for manufacturing blades for a wind turbine. A mould core is placed to a layer of glass fibre, which is laid in a mould part forming an underside of a blade. On top of the mould core, a further layer of glass fibre is laid. Finally, an upper mould part is laid over the mould core, so that the fibre layers that are pressed to the mould core form the profile of the blade.

After curing of the fibre layers in the mould parts, the mould core has to be removed, which may cause difficulties due to the large size of the wind turbine blades and due to the complex profiles of the wind turbine blades.

SUMMARY OF THE INVENTION

It may be an object of the present invention to simplify a manufacturing method for a wind turbine blade.

This object is solved by a method for forming a profile for manufacturing hollow components made of composite fibre, in particular a hollow blade for a wind turbine, by a blade for a wind turbine and by a moulding system for applying the method according to the independent claims.

According to a first aspect of the present invention, a method for forming a profile for manufacturing a hollow component made of composite fibre, in particular a hollow blade for a wind turbine, is presented. According to the method, a first composite fibre layer is laid out on a first mould surface of the first mould element, wherein the first mould surface corresponds to a first profile section of the hollow component to be manufactured. A second composite fibre layer is laid out in a second mould surface of the second elements, wherein the second mould surface corresponds to a second profile section of the hollow component to be manufactured. A bag is laid out in a collapsed state onto the first composite fibre layer.

The bag and the first composite fibre layer are fixed to the first mould surface. The first mould element is coupled to the second mould element in such a way, that the first mould surface and the second mould surface correspond to the profile of the hollow component (e.g. the wind turbine blade) to be manufactured. The bag is inflated in such a way, that the first composite fibre layer is pressed to the first mould surface and the second composite fibre layer is pressed to the second mould surface, so that the first composite fibre layer and the second composite fibre layer are coupled to form the profile of the hollow component to be manufactured.

According to a further exemplary embodiment, a blade for a wind turbine is presented, wherein the blade is manufactured by the above mentioned method.

Moreover, according to a further aspect of the present invention, a moulding system for applying the above mentioned method for the manufacturing hollow components made of composite fibre is presented.

The first mould element may be an upper mould part and the second mould element may be a lower mould part of a moulding device. The first mould element may comprise the first mould surface, wherein the first mould surface forms for example a female mould of a first section of a profile of the hollow component to be formed. When laying a first composite fibre layer into the first mould element on the first mould surface, the first composite fibre forms the first profile section of the hollow component. For example, if the first mould element is an upper half and the second mould element is a lower half, the first mould surface forms a female mould of the upper half of the hollow component (e.g. upper half of a blade) to be manufactured and the second mould surface forms a female mould of the lower half of the component (lower half of the blade) to be manufactured. Beside this, the moulding device may comprise the first mould element, the second mould element and further mold elements, so that the mould surface is formed by the first mould surface, the second mould surface and the further mould surface, to which two or a plurality of individual composite fibre layers may be laid onto. In other words, the final profile of the component to manufactures may be divided in more than two profile sections.

The composite fibre layers may be formed with fibres in a uni-directional or multi-directional orientation with respect to each other. Moreover, the composite fibres may be provided in a web form, a woven form, such as a fibre mat or a prepreg. The first fibre layer may describe one or a plurality of fibre layers laid on top of each other located to the first mould element and the second fibre layer describes one or a plurality of fibre layers laid on top of each other located to the second mould element.

The composite fibres may comprise glass fibres, carbon fibres or other polymer fibre materials.

The bag is a flexible, i.e. inflatable and foldable, hollow body made for example of rubber or other elastic material.

The bag may be collapsible and inflatable. In a collapsed state, the bag is folded and minimized in size and in the inflated state, the bag is maximized in size. The inflatable state of the bag may be achieved by blowing-in pressurized air inside the hollow bag or by applying underpressure at the environment of the bag. The bag is impermeable with respect to e.g. liquids i.e. resin and airtight.

By the present invention a mould dorn to which composite fibre layers are placed in the prior art manufacturing methods may be obsolete and a hollow component, such as the blade of wind turbine, may be manufactured in one step. This is achieved by fixing (securing) the collapsed bag and the first composite fibre layer to the first mould element. The fixing of the bag and the first composite fibre layer may be achieved by applying an adhesive (e.g. resin) or by providing underpressure between the bag and the first mould surface. Hence, when the bag and the first composite fibre layer is fixed to the mould surface, the first mould element may be handled very simple and no slipping and relative movement of the first composite fibre layer with respect to the first mould surface is caused, because the first composite fibre layer is pressed on the first mould surface by the bag. For this reason, the first mould element may be turned overhead without a falling-out of the bag and the first composite fibre layer out of the first mould element. Hence, the first mould element and the second mould element may be assembled easily and later after a coupling of both mould elements, finalizing steps, such as resin injection or curing may be applied for finalizing the profile of the component to be formed.

By the prior art manufacturing methods, a massive dorn is put to a composite fibre layer in a mould element and later the second composite fibre layer has to be placed on top of the massive dorn. Finally, the second mould element is coupled to the first mould element, wherein there is a risk that the second composite fibre layer slips away. Moreover, the adjustment of all parts in the mould element is complex. With the presented inventive method, the first composite fibre layer and the inflatable bag are already fixed and aligned to the first mould element before the first mould element is coupled to the second mould element. For this reason, a slipping of the first composite fibre layer with respect to the first mould element may be prevented. A pressing of the composite fibre layers to the surfaces of the mould elements may be accomplished by the inflatable bag. For the fixing of the bag and the first composite layer to the upper first mould element, a massive dorn may be obsolete.

Additionally, after curing the composite fibre layers, the bag may be collapsed and thus reduced in size again, so that the bag may easily be removed from the inner cavity of the manufactured hollow component.

This is beneficial, if a complex component, such as a blade for a wind turbine, is manufactured that is e.g. twisted in its length direction. By such a twisting of the wind turbine blade, conventional massive dorns are complex to remove. By the inflatable bag, an easy removal of the bag from the inner cavity of a finalized wind turbine blade is achieved.

According to a further exemplary embodiment of the present invention, the fixing of the bag is achieved by sucking off air between the bag and the first mould surface, such that the bag and the first composite fibre layer are fixed to the first mould surface by underpressure (i.e. vacuum). Hence, by the present exemplary embodiment the bag may easily be removed when stopping to suck-off air. Additionally or alternatively, the bag and/or the first composite layer may be fixed to the first mould surface by an adhesive (e.g. resin), for example. An additional fixing pressure from outside, e.g. by a massive dorn, may be obsolete.

According to a further exemplary embodiment, the first composite layer is larger than the first mould surface such that the first composite fibre layer forms a surplus section that extends over an edge of the first mould surface. The surplus section describes an excess length, an overhang or a protrusion. By using a surplus section in particular at the margin areas of the first composite fibre layer, an overlapping of the second composite fibre layer over the edges of the mould element, which edges defines the area of the first mould surface corresponds to a size of a respective profile section, may be achieved. The surplus section is movable (e.g. foldable) and is not fixed to the first mould surface by the bag.

According to a further exemplary embodiment, the coupling of the first mould element to the second mould element comprises an adjusting of the first mould element to the second mould element in such a way, that the surplus section overlaps partially with the second composite fibre layer in the second mould element. Hence, the contact areas (interface sections) between the first composite fibre layer and the second composite fibre layer may be reinforced, so that a more robust component may be manufactured. Thereby, during the adjustment of the first mould elements to the second mould elements, the surplus section is bended to the inside into a cavity formed between the coupled mould elements, so that the surplus section overlaps with the second composite fibre layer.

In another exemplary embodiment of the present invention, the adjusting comprises an arranging of the first mould element in such a way that the surplus section is aligned in a predetermined position by gravity. Next, the first mould element is brought together with the second mould element, wherein, when the surplus section is in the predetermined position, the surplus section overlaps partially with the second composite fibre layer in the second mould element. For example, if the first mould element is turned overhead, the surplus section, which is not fixed to the first mould element, is aligned in a proximately vertical orientation, because of gravity. When bringing together the first mould element and the second mould element, the end of the surplus section touches the second composite fibre layer. When moving the first mould element and the second mould element further together, the end of the surplus sections slides along the second composite fibre layer in the direction to the inner cavity formed between the first mould element and the second mould element. Hence, in a final state, when the first mould element and the second mould element are fixed together finally, the surplus section forms the overlap section with the second composite fibre layer.

According to a further exemplary embodiment, the inflating of the bag comprises a lifting of the surplus section by inflating the bag in such a way that the surplus section overlaps partially with the second composite fibre layer in the second mould element. By the present exemplary embodiment, the surplus section may be folded in such a way that the surplus section lies onto the collapsed surface of the bag. The inflating of the bag causes the surplus section to move together with the surfaces of the bag until the bag is inflated to its final position. In the final position, the surplus section is pressed on the second composite fibre layer.

According to a further exemplary embodiment of the method, a second composite fibre layer is larger than the second mould surface such that the second composite fibre layer forms a further surplus section, that extends over an edge of the second mould surface. The coupling of the first mould element to the second mould element further comprises an adjusting of the first mould element to the second mould element in such a way, that the further surplus section overlaps partially with the first composite fibre layer in the first mould element.

According to a further exemplary embodiment, the method comprises before coupling the first mould element to the second mould element a mounting of a web to the first composite fibre layer or to the second composite fibre layer in such a way that after coupling of the first mould element with the second mould element the web is coupled with the first composite fibre layer and the second composite fibre layer for reinforcing the hollow component to be manufactured.

The web describes a robust and hard element that consists of e.g. wood, metal, composite fibre materials or other hard and inelastic materials. The web is mounted inside the inner cavity of the hollow component to be manufactured and is in contact with the first composite fibre layer and the second composite fibre layers, so that a force may be transmitted between the layers. Hence, a reinforcement of the composite fibre component is generated.

The web may be fixed to the first composite fibre layer, e.g. by welding or gluing. Moreover, the web may be wrapped into the composite fibre material of the first and/or second composite fibre layer.

According to a further exemplary embodiment, the method comprises before coupling the first mould element to the second mould element a mounting of a web to the first composite fibre layer and a mounting of a web to the second composite fibre layer in such a way that after coupling of the first mould element to the second mould element the web and the further web are coupled with each other for reinforcing the hollow component to be manufactured. The web and the further web each comprises for example a first face to which the web and the further web are mounted to the respective composite fibre layer. The web and the further web each may comprise a further face, with which the webs contact each other. Hence, a force may be transmitted between the web and the further web and hence, a force may be transmitted between the composite fibre layers for reinforcing the hollow component to be manufactured.

According to a further exemplary embodiment, the inflating of the bag comprises a sucking off air between a) the bag and the first mould surface, and b) the bag and the second mould surface. Hence, the bag presses the first composite fibre layer to the first mould surface and the second composite fibre layer to the second mould surface. The bag may comprise in its inflated state a shape of the profile of the component to be manufactured. Alternatively, the bag may be elastic, so that the bag may comprise an arbitrary shape and the inflated shape of the inflated elastic bag adjusts itself by sucking off air or by blowing-up the bag until the final profile of the component to be manufactured is achieved and the shape of the (elastic) bag adjusts itself to the shape of the first mould surface and the second mould surface.

The first mould element and/or the second mould element may comprise connections, to which a vacuum pump may be connected for sucking off air from the respective mould surfaces. Hence, e.g. a sucking off of the air between the bag and the first mould surface leads to an inflating of the bag. In other words, the inflating of the bag may be achieved by a pressure difference between the inside of the bag and the outside of the bag.

According to a further exemplary embodiment, the inflating of the bag comprises a blowing-in pressurized air into the bag, such that the bag presses the first composite fibre layer to this first mould surface and the second composite fibre layer to the second mould surface. Hence, the pressure difference between the inside of the bag and the outside of the bag is achieved by blowing-in pressurized air.

According to a further exemplary embodiment of the present invention, a moulding system for applying the above described method for manufacturing a hollow component made of composite fibre is presented. The moulding system comprises the first mould element, the second mould element and the bag.

By the present invention, a manufacturing method is presented, wherein a component, e.g. a hollow turbine blade, may be manufactured in one single mould process and wherein a massive dorn inside the hollow component for manufacturing purposes may be obsolete.

In a first step, composite fibre layers, such as glass fibre layers, that form the blade are laid out into two separate mould elements, wherein each first and second mould element may form approximately a half-profile of the blade. For example, the profile of the wind turbine blade may be divided by the main camber line (main line) that connects the leading edge of the turbine blade to the trailing edge of the turbine blade, so that the first mould element comprise a mould surface that corresponds to the upper half of the turbine blade profile, and the second mould surface of the second mould element corresponds to the lower half of the turbine blade, for example.

The glass fibre layers are laid in the respective mould elements for each blade half, respectively. To the blade halves, one or more blade webs made be attached, e.g. by wrapping the webs into the glass fibre material, in order to ensure a secure fastening of the web to the rest of the blade structure.

Moreover, a surplus glass fibre material, which extends over a side of one of the mould surfaces, may be provided.

In a second step of the method, one or more air and resin-tight bags are laid over substantially the entire mould surface of the composite fibre layer in particular to the first mould element, which e.g. comprises also the surplus section of the glass fibre material.

The bag covers at least a major part of the first composite fibre layer. In particular, the bag does not cover the surplus section of the first composite fibre layer, so that the surplus section is still movable.

The bag surface or the sum of the surface of the plurality of bags should have a surface size, which is at least twice the area, which is in contact with the first composite fibre layer, so that after inflating, the bag also covers a corresponding section of the second composite fibre layer.

In a third step, in particular a vacuum is applied in the space between the first mould surface and the bag. By applying a vacuum (underpressure) in the space, the bag is dragged towards the first mould surface and presses the first composite fibre layer to the first mould surface. This in turn holds the first composite fibre layer and the bag fixed in position in the first mould, even if the bag does not completely cover the whole surface area of the first composite fibre layer.

In a fourth step, the first mould element is rotated overhead, e.g. 180 degrees around a longitudinal axis of the first mould element, to an up-side-down position of the first mould element, including the bag, the first composite fibre layer and the, for example. Hereby, the free-movable surplus section hangs down from the first mould element in an approximately vertical direction caused by gravity.

In a fifth step, the first mould element is lowered and positioned with respect to the second mould element. The surplus section is hereby folded into the cavity that is formed between the first mould element and the second mould element and the surplus section is aligned with the inner surface of the second composite fibre material in the second mould.

In a sixth step, the bag is unfolded and inflated in order to fill the entire inner cavity between the first mould element and the second mould element, respectively between the first composite fibre layer and the second composite fibre layer. Thereby, the bag holds the composite fibre layers to the respective mould surfaces.

The unfolding of the bag may be performed by either applying an underpressure (vacuum) to the cavity, in particular between the surface of the bag and the first mould surface and the second mould surface. Moreover, the bag may be inflated by pressurized air that is blown inside the bag.

In order to provide an airtight connection between the first mould element and the second mould element and in order to achieve an airtight inner cavity, seals may be interposed between the intersections between the first mould element and the second mould element.

When the bag is unfolded and inflated, an underpressure (vacuum) may be applied to the space between the first mould surface, the second mould surface and the bag, so that by resin injection, resin is injected to the first composite fibre layer and the second composite fibre layer. Finally, curing and casting of the hollow components may be accomplished and the finished hollow component may be removed easily from the mould elements.

The surplus section may be lifted to its final position to e.g. by inflating and unfolding the bag. The surplus fibre section may as well be formed at both composite fibre layers. If the hollow component is a blade of a wind turbine, the surplus section may be formed, e.g. in the first and/or the second composite fibre layer on e.g. the leading edge of the blade or the trailing edge of the blade to be formed.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
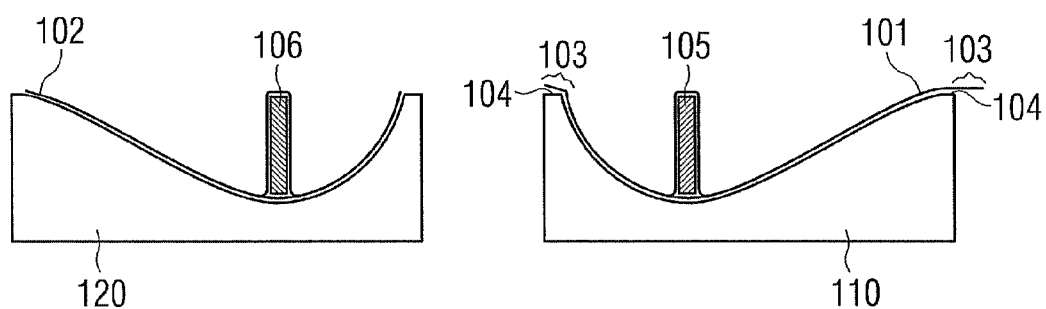
FIG. 1 shows the first mould element and the second mould element in a decoupled state according to an exemplary embodiment of the present invention.

The illustrations in the drawings are schematical. It is noted that in different figures, similar or identical elements are provided with the same reference signs.

In FIG. 1 to FIG. 5, a method for forming a profile for manufacturing a hollow component made of composite fibre, in particular a hollow blade for a wind turbine, is shown.

FIG. 1 shows a first mould element 110 and a second mould element 120. To a first mould surface of the first mould element 110 a first composite fibre layer 101 is laid out. The first mould surface corresponds to a first profile section of the hollow component to be manufactured. For example, the hollow component is a blade of a wind turbine, so that the first profile section may form a (upper) half of the blade to be manufactured.

A second composite fibre layer 102 may be laid out onto a second mould surface of the second mould element 120, wherein the second mould surface corresponds to a second profile section of the hollow component to be manufactured. The second profile section may form a (lower) half of the blade to be manufactured.

Moreover, as shown in FIG. 1, a web 105 may be attached to the first mould element that is adapted for reinforce the hollow component to be manufactured. To the first mould element 110 one or a plurality of webs 105 may be attached and to the second mould element 120 one or a plurality of further webs 106 may be attached. The webs 105, 106 may be glued, welded or webbed to the respective composite fibre layers 101, 102. The first and second mould surfaces are limited by respective edges 104. As shown in FIG. 1, the first composite fibre layer 101 may comprise surplus sections 103 that run over the edges 104 in a direction to outside of the respective mould surface. The surplus sections 103 are formed, when the first composite fibre layer 101 is made larger than the first profile section defined by the first mould surface, respectively.

Figure 2:
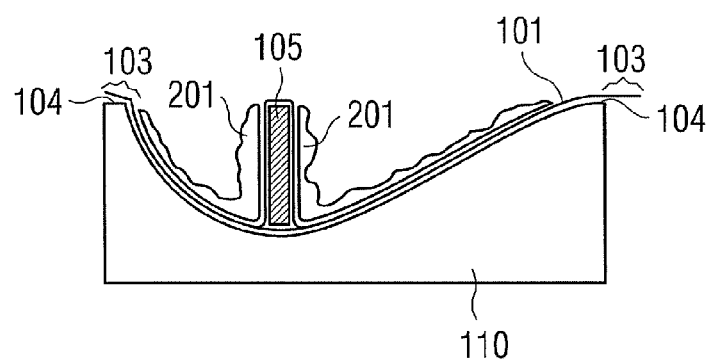
FIG. 2 shows the first mould element, to which the bag is placed according to an exemplary embodiment of the present invention.

FIG. 2 shows the first mould element 110 in a further method step. To the third composite fibre layer 101 a bag 201 is laid out, wherein the bag 201 is in a collapsed state. As shown in FIG. 2, it is also possible to lay a plurality of collapsed bags 201 to the first composite fibre layer 101. The surplus sections 103 are not covered by the bag 201, so that the surplus sections 103 are freely movable. The web 105 may be adapted to be in contact with the surface of the second composite fibre layer 102 or comprises a face that is in contact with a face of the further web 106 mounted to the second composite fibre layer 102. The face of the web 105 or the further web 106 is not covered by a respective bag 201.

Figure 3:
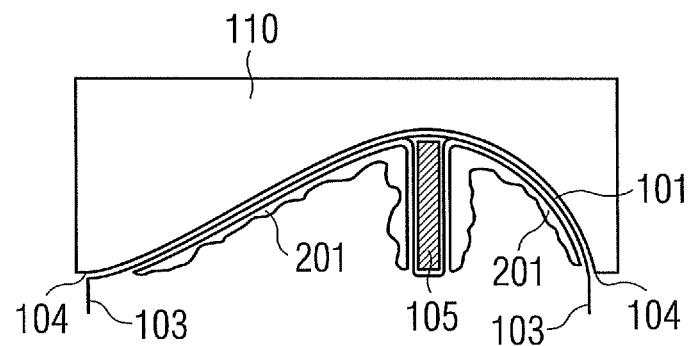
FIG. 3 shows the first mould element, which is turned upside-down according to an exemplary embodiment of the invention.

FIG. 3 shows a view of the first mould element 110 that is moved upside-down and in an overhead position. The freely movable surplus sections 103 are aligned in general in a vertical position, for example, by gravity. The bags 201 and the first composite fibre layer 101 are fixed to the first mould surface of the first mould element 110. The fixation may be generated e.g. by gluing (with resin) the elements together or by applying underpressure between the bag 201 and the first mould surface. Hence, the bag 201, the web 105 and the first composite fibre layer 101 do not fall out of the first mould element 110 by gravity. Moreover a relative movement between the bag 201, the web 105 and the first composite fibre layer 101 is prevented, so that no readjustment later on is necessary.

Figure 4:
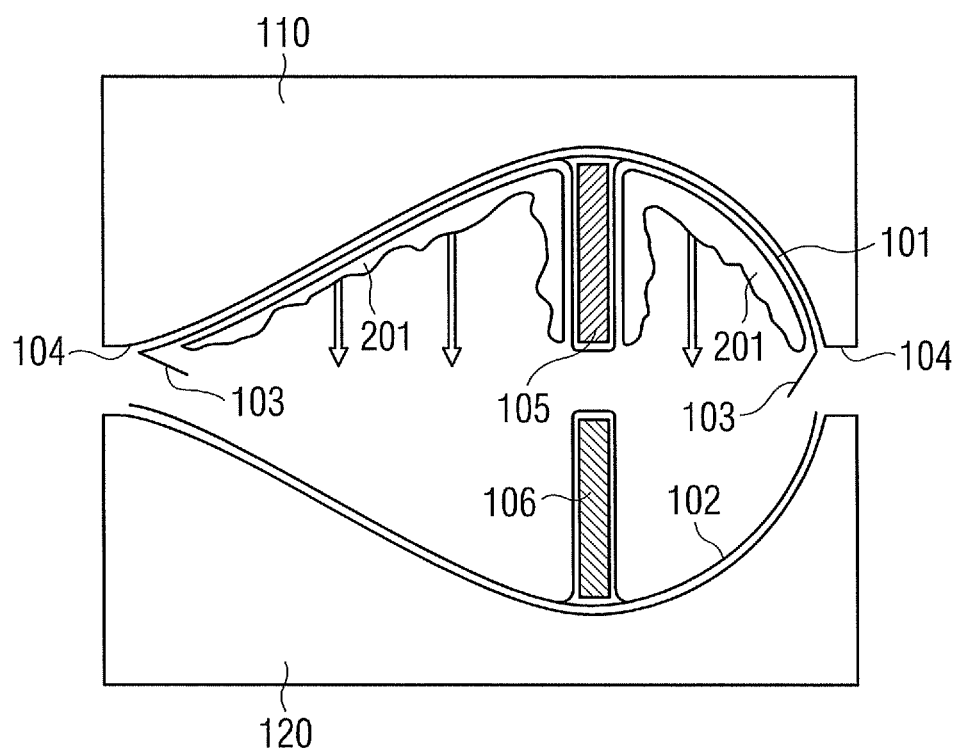
FIG. 4 shows a coupling of the first mould element and the second mould element according to a further exemplary embodiment of the present invention.

FIG. 4 illustrates the first mould element 110 and the second mould element 120 in a state before the first mould element 110 and the second mould element 120 contact each other. The surplus sections 103 are either folded inwardly by additional devices. Moreover, the end faces of the surplus sections 103 may contact the second composite fibre section 102, so that during movement of the first mould element 110 to the second mould element 120 the surplus sections 103 moves (slips) self-acting in a direction to the inner cavity formed between the first mould element 110 and the second mould element 120.

Figure 5:
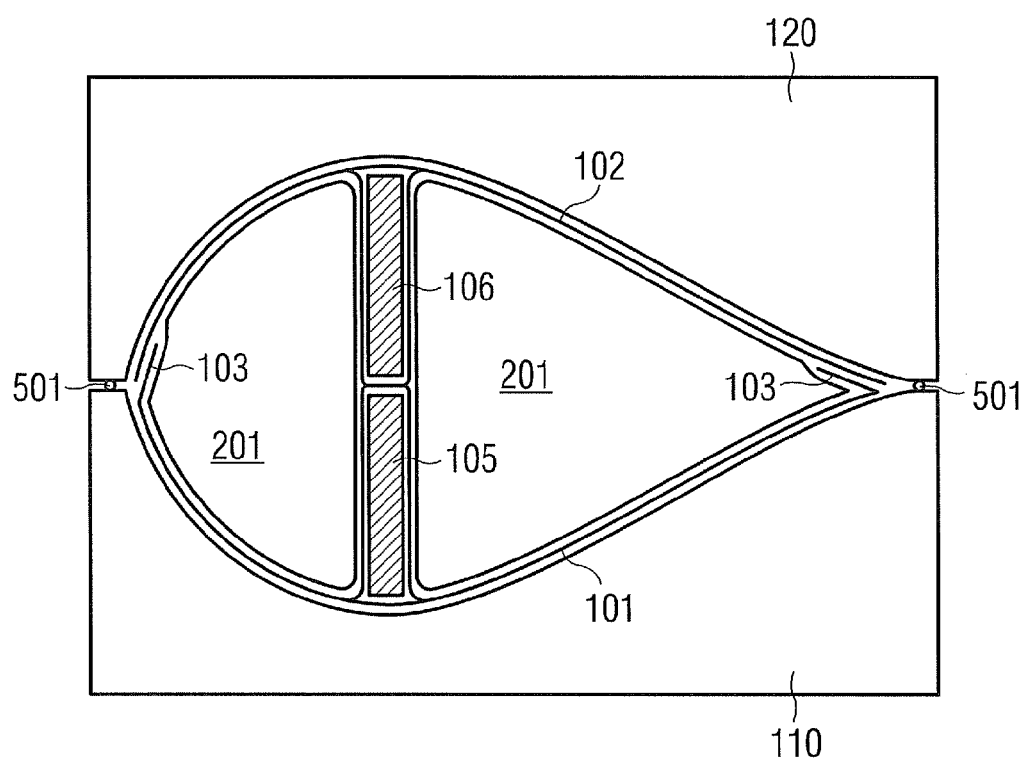
FIG. 5 shows a coupled state of the first mould element and the second mould element according to an exemplary embodiment of the invention.

FIG. 5 illustrates the first mould element 110 and the second mould element 120 that are in contact with each other. As shown in FIG. 5, the surplus sections 103 of the first composite fibre layer 101 overlap the second composite fibre layer 102. In particular, the surplus sections 103 overlap the second composite fibre layer 102 at a position, where the interface of the first mould element 110 and the second mould element 120 is located. In particular, if the first mould surface forms an upper half of a blade to be manufactured and the second mould surface forms a second half of the blade to be manufactured, the interface of the first mould element 110 and the second mould element 120 is built in the region of the leading edge and the trailing edge of the blade to be manufactured.

As shown in FIG. 5, in the coupled state of the first mould element 110 and the second mould element 120, the web 105 and the further web 106 are in contact with each other, so that a force may be transmitted from the first composite fibre layer 101 to the second composite fibre layer 102. Hence, the web 105 and the further web 106 form a reinforcement of the hollow component to be manufactured. The inner cavity that is formed in the space between the first mould surface and the second mould surface, the bags 201 are inflated. Hence, the bags 201 press the first composite fibre layer 101 and the second composite fibre layer 102 to the respective mould surfaces. The inflating of the bag 201 may be achieved for example by injecting pressurized air inside of the respective bags 201. In another preferred embodiment, a vacuum pump may be connected to the mould elements 110, 120, so that air is sucked-off from a space between the surface of the bag 201 and the first mould surface and the second mould surface (and the space between the bags 201 and the respective web surfaces). Hence, by the pressure difference between the inner volume of the respective bag 201 and the outer space between the bag 201 and the respective mould surfaces, the bags 201 inflate and pressure the respective composite fibre layers to the mould surfaces. In order to optimize the sucking off of the air, sealing elements 501 may be attached to the interfaces between the first mould element 110 and the second mould element 120 in order to seal the inner cavity formed inside the first mould element 110 and the second mould element 120.

Additionally, when an underpressure is generated between the bags 201 and the first and second mould surfaces and the webs 105, 106, resin may be injected, so that the composite fibre layers 101, 102 are soaked with resin.

Hence, after injecting the resin, the composite fibre layers 101, 102 may be cured, so that the final profile and the final robust hollow component, such as the blade, is manufactured. After curing of the composite fibre layers 101, 102, the underpressure between the bags 201 and the first and second mould surfaces may be reduced, so that the bags 201 collapse again. In the collapsed state of the bags 201, the bags 201 comprise a reduced and small volume, so that they can be easily removed from the inner cavity of the manufactured component.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for forming a profile for a hollow blade component for a wind turbine, the method comprising:
   a) laying out a first composite fibre layer on a first mould surface of a first mould element, wherein the first mould surface corresponds to a first profile section of the hollow blade component to be manufactured, wherein the first composite fibre layer is larger than the first mould surface such that the first composite fibre layer forms a surplus section that extends over an edge of the first mould surface;
   b) laying out a second composite fibre layer in a second mould surface of a second mould element, wherein the second mould surface corresponds to a second profile section of the hollow blade component to be manufactured;
   c) laying out a bag in a collapsed state onto the first composite fibre layer;
   d) fixing the bag and the first composite fibre layer to the first mould surface;
   e) after (a), (b), (c) and (d) coupling the first mould element to the second mould element in such a way, that the first mould surface and the second mould surface correspond to the profile of the hollow blade component to be manufactured, wherein the coupling of the first mould element to the second mould element causes the surplus section to move relative to the first mould surface responsive to gravity so as to become partially overlapped with the second composite fibre layer in the second mould element, and
   f) after (e) inflating the bag in such a way that the first composite fibre layer is pressed to the first mould surface, the second composite fibre layer is pressed to the second mould surface, and the surplus section is pressed to the second composite fibre layer, so that the first composite fibre layer and the second composite fibre layer are coupled to form the profile to be manufactured.

2. The method according to claim 1, wherein the fixing comprises sucking off air between the bag and the first mould surface such that the bag and the first composite fibre layer are fixed to the first mould surface by underpressure.

3. The method according to claim 2, wherein the adjusting comprises:
   bringing together the first mould element with the second mould element, wherein, when the surplus section is in the predetermined position, the surplus section overlaps partially with the second composite fibre layer in the second mould element.

4. The method according to claim 1, wherein the second composite fibre layer is larger than the second mould surface such that the second composite fibre layer forms a further surplus section that extends over an edge of the second mould surface, and wherein the coupling of the first mould element to the second mould element further comprises
   adjusting the first mould element to the second mould element in such a way that the further surplus section overlaps partially with the first composite fibre layer in the first mould element.

5. The method according to claim 1, wherein before coupling the first mould element to the second mould element the method further comprises
   mounting a web to the first composite fibre layer or to the second first composite fibre layer in such a way that after coupling of the first mould element to the second mould element the web is coupled with the first composite fibre layer and the second composite fibre layer for reinforcing the hollow blade component to be manufactured.

6. The method according to claim 1, wherein before coupling the first mould element to the second mould element the method further comprises
   mounting a web to the first composite fibre layer, and
   mounting a further web to the second composite fibre layer in such a way that after coupling of the first mould element to the second mould element the web and the further web are coupled with each other for reinforcing the hollow blade component to be manufactured.

7. The method according to claim 1, wherein the inflating of the bag comprises sucking off air between:
   the bag and the first mould surface; and
   the bag and the second mould surface, such that the bag presses the first composite fibre layer to the first mould surface and the second composite fibre layer to the second mould surface.

8. The method according to claim 1, wherein the inflating of the bag comprises
blowing pressurized air into the bag such that the bag presses the first composite fibre layer to the first mould surface and the second composite fibre layer to the second mould surface.

* * * * *